(No Model.)

J. G. F. JOHNSON.
INSECT TRAP.

No. 400,572. Patented Apr. 2, 1889.

WITNESSES:
D. C. Reusch
C. Sedgwick

INVENTOR:
J. G. F. Johnson
BY Munn & Co.
ATTORNEYS.

UNITED STATES PATENT OFFICE.

JENNIE G. F. JOHNSON, OF MOUNT VERNON, NEW YORK.

INSECT-TRAP.

SPECIFICATION forming part of Letters Patent No. 400,572, dated April 2, 1889.

Application filed January 5, 1889. Serial No. 295,503. (No model.)

*To all whom it may concern:*

Be it known that I, JENNIE G. F. JOHNSON, of Mount Vernon, in the county of Westchester and State of New York, have invented a new and Improved Insect-Trap, of which the following is a full, clear, and exact description.

The object of my invention is to provide a trap for insects; and to the end named the invention consists, essentially, of a bait box or receptacle and a surrounding trough adapted to receive a substance that is poisonous to the insects or over which they cannot readily pass, the whole being inclosed in a structure having a hood which overhangs the bait-box, all as will be hereinafter more fully explained, and specifically pointed out in the claim.

Reference is to be had to the accompanying drawings, forming a part of this specification, in which similar figures of reference indicate corresponding parts in both views.

Figure 1:
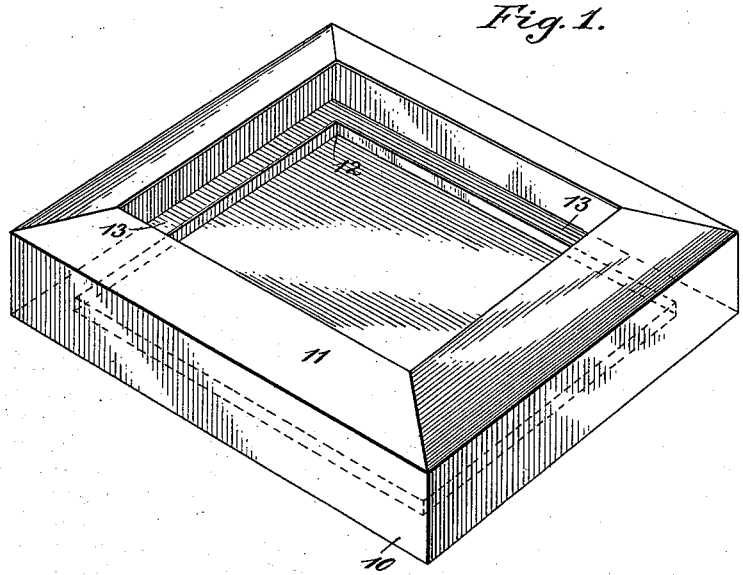
Figure 2:
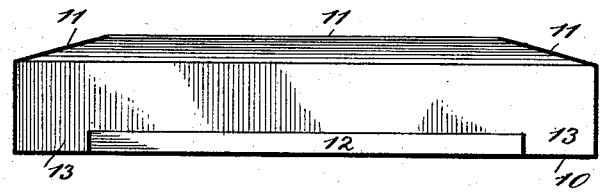

Figure 1 is a perspective view of my improved insect-trap, and Fig. 2 is a cross-sectional view thereof.

In the drawings, 10 represents a box-like structure of any desired form, which said structure is provided with a hood, 11, beneath which there is arranged a bait box or receptacle, 12, said box being surrounded by a trough, 13, adapted to receive oil or other material that is obnoxious or poisonous to insects.

In operation the bait—such as sugar, molasses, flour, or anything upon which insects feed—is placed in the box 12, and the insects, scenting the bait, crawl up over the hood 11 and drop into the said box 12, from which it is impossible for them to escape without crossing the trough 13, which, as before stated, is filled with poisonous material. Should the insects cross the trough, the overhanging hood will prevent them from leaving the trap.

The trap I have described is designed especially for use as a roach or ant trap; but it could be used for catching and destroying any other insects which infest dwellings, restaurants, and other places where food products are prepared, used, or sold.

Although I have illustrated a specific form of trap, I desire it to be distinctly understood that any trap provided with a bait-receptacle that is surrounded by a trough would be within the terms of my invention.

Having thus described my invention, I claim as new and desire to secure by Letters Patent—

In an insect-trap, the combination, with a bait-receptacle, of a surrounding-trough and a hood which overhangs the bait-receptacle, substantially as described.

JENNIE G. F. JOHNSON.

Witnesses:
 DAVID A. GLANCY,
 C. H. OSTRANDER.